United States Patent [19]
Roberts

[11] Patent Number: 5,921,636
[45] Date of Patent: Jul. 13, 1999

[54] TAPERED NOISE ATTENUATOR FOR ANTI-LOCK BRAKING SYSTEM

[75] Inventor: Christopher J. Roberts, Canton, Mich.

[73] Assignee: Kelsey-Hayes Company, Livonia, Mich.

[21] Appl. No.: 08/874,748

[22] Filed: Jun. 13, 1997

Related U.S. Application Data

[60] Provisional application No. 60/020,878, Jun. 28, 1996.

[51] Int. Cl.$^6$ ...................................................... B60T 17/04
[52] U.S. Cl. .................................. 303/87; 138/30; 138/31
[58] Field of Search ................................. 303/87, 81, 69, 303/68; 138/28, 31, 40, 26, 46, 41, 30

[56] References Cited

U.S. PATENT DOCUMENTS

| | | |
|---|---|---|
| 3,757,825 | 9/1973 | Givens et al. . |
| 4,162,692 | 7/1979 | Greer et al. . |
| 4,453,782 | 6/1984 | Arikawa et al. . |
| 4,571,009 | 2/1986 | Jones . |
| 4,828,335 | 5/1989 | Fuller et al. . |
| 5,031,664 | 7/1991 | Alaze ......................................... 138/31 |
| 5,066,075 | 11/1991 | Kaneda et al. . |
| 5,096,400 | 3/1992 | Budecker et al. . |
| 5,143,428 | 9/1992 | Toda et al. . |
| 5,209,554 | 5/1993 | Beilfuss et al. . |
| 5,232,273 | 8/1993 | Eckstein et al. . |
| 5,244,262 | 9/1993 | Kehl et al. . |
| 5,271,667 | 12/1993 | Takata et al. . |
| 5,417,481 | 5/1995 | Megerle et al. ........................... 303/87 |
| 5,540,486 | 7/1996 | Linkner . |
| 5,732,741 | 3/1998 | Shiery ....................................... 138/30 |

FOREIGN PATENT DOCUMENTS

| | | |
|---|---|---|
| 0491159A1 | 11/1991 | European Pat. Off. . |
| 1373140 | 12/1964 | France . |
| 1963709 | 7/1971 | Germany . |
| 4029846 | 4/1991 | Germany . |
| 4002635 | 8/1991 | Germany . |
| 4128386 | 3/1993 | Germany . |
| 1106759 | 4/1989 | Japan . |

Primary Examiner—Christopher P. Schwartz
Assistant Examiner—Melanie Talayera
Attorney, Agent, or Firm—MacMillan, Sobanski & Todd, LLC; A. Michael Tucker

[57] ABSTRACT

An attenuator for a hydraulic control unit of a vehicular braking system includes a hollow cylinder mounted in a bore of a housing. An end cap closes an outer end of the cylinder and does not extend beyond an outer wall of the housing. The cylinder and end cap define an interior chamber having an inner diameter tapered toward the end cap. An orifice is formed in the cylinder to permit fluid to exit the tapered interior chamber. An elastic core piece is fitted into the tapered interior chamber and substantially fills the volume of the chamber. An annular clearance is provided between the core piece and the cylinder. An inlet passage formed in the housing delivers fluid to the chamber. Fluid passes about the core piece to the orifice to reach the an outlet passage formed in the housing. Clearance between the core piece and the cylinder provides a streamlined path for fluid traveling from the inlet passage to the outlet passage, thereby decreasing fluid turbulence and aeration found in prior art attenuators.

20 Claims, 3 Drawing Sheets

TAPERED NOISE ATTENUATOR FOR ANTI-LOCK BRAKING SYSTEM

This application claims benefit of provisional application 60/020,878, filed Jun. 28, 1996.

BACKGROUND OF THE INVENTION

This invention relates in general to vehicular braking systems, and in particular to a noise attenuator in a hydraulic control unit of an anti-lock vehicular braking system.

The use of attenuators which reduce amplitude of pressure fluctuations in hydraulic fluid lines of vehicular braking systems is well known. In particular, attenuators are common in vehicular anti-lock braking systems (ABS) at the outlet end of an ABS hydraulic pump used to generate supplemental brake fluid pressure. A hydraulic control unit (HCU) includes a housing having bores for mounting valves and the like and channels for directing fluid. An attenuator is mounted in a bore in the HCU to significantly reduce the amplitude of high energy pressure pulses in the brake fluid at the outlet of the pump. Such pressure pulses can be in the order of 900–1000 psi and can create noise which is transmitted to the master cylinder or its connection to the vehicle. An attenuator at the outlet end of the pump can reduce the pressure pulses to about 100–300 psi, thereby substantially reducing or eliminating noise associated with such pulses.

A conventional attenuator includes a closed chamber filled with brake fluid. An inlet passage delivers fluid from the outlet end of the pump. An orifice of substantially reduced diameter directs fluid from the chamber to an outlet passage. The restriction of fluid flow through the orifice attenuates pressure fluctuations as a result of the compressibility of the brake fluid. Thus, brake fluid in the chamber absorbs high energy fluid pulses and slowly releases the fluid through the orifice.

SUMMARY OF THE INVENTION

This invention includes a noise attenuator for vehicular braking systems. An attenuator according to this invention attenuates hydraulic braking fluid pulses which can occur during activation of an anti-lock braking system (ABS), thereby reducing noise associated with such pulses. The attenuator is readily compatible with conventional hydraulic control units.

In a preferred embodiment, an attenuator for a hydraulic control unit of a vehicular braking system includes a hollow cylinder mounted in a bore of a housing. An end cap closes an outer end of the cylinder and does not extend beyond an outer wall of the housing. The cylinder and end cap define an interior chamber having an inner diameter tapered toward the end cap. An orifice is formed in the cylinder to permit fluid to exit the tapered interior chamber. An elastic core piece is fitted into the tapered interior chamber and substantially fills the volume of the chamber. An annular clearance is provided between the core piece and the cylinder. An inlet passage formed in the housing delivers fluid to the chamber. Fluid passes about the core piece to the orifice to reach the an outlet passage formed in the housing. Clearance between the core piece and the cylinder provides a streamlined path for fluid traveling from the inlet passage to the outlet passage, thereby decreasing fluid turbulence and aeration found in prior art attenuators.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
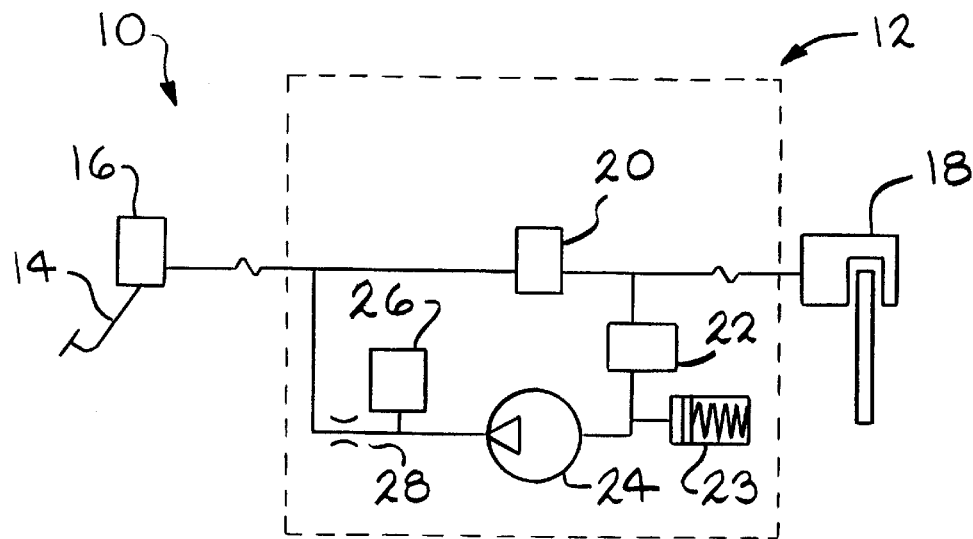
FIG. 1 is a schematic representation of a conventional vehicular anti-lock braking system.

A conventional vehicular braking system is indicated generally at 10 in FIG. 1. The system 10 includes an anti-lock braking system (ABS) unit 12 positioned between a brake pedal 14 acting on a master cylinder 16 and a slave cylinder 18 of a wheel brake assembly, e.g., a disc brake as illustrated in FIG. 1. The ABS unit 12, also referred to as a hydraulic control unit (HCU), includes an isolation valve 20, a hold/dump valve 22, a low pressure accumulator 23, a pump 24, an attenuator 26 and an orifice 28. During normal braking (i.e., no wheel lock-up), an operator applies foot pressure to the brake pedal 14 causing the master cylinder 16 to provide brake fluid under pressure through the isolation valve 20 to the slave cylinder 18, thereby providing driver modulated or controlled braking of one of the vehicle wheels.

If a wheel lock-up condition is sensed by a sensor (not illustrated), the solenoid-actuated isolation valve 20 is closed to prevent a further increase in brake fluid pressure. The solenoid-actuated hold/dump valve 22 is then opened as needed to reduce brake fluid pressure by allowing flow into the low pressure accumulator 23. The pump 24 forces fluid from the low pressure accumulator 23 to the inlet side of the isolation valve 20. Upon the measure of wheel lock-up, the hold/dump valve 22 is closed and the isolation valve 20 is opened as needed so that high pressure fluid is again applied to the brake cylinder 18.

Figure 2:
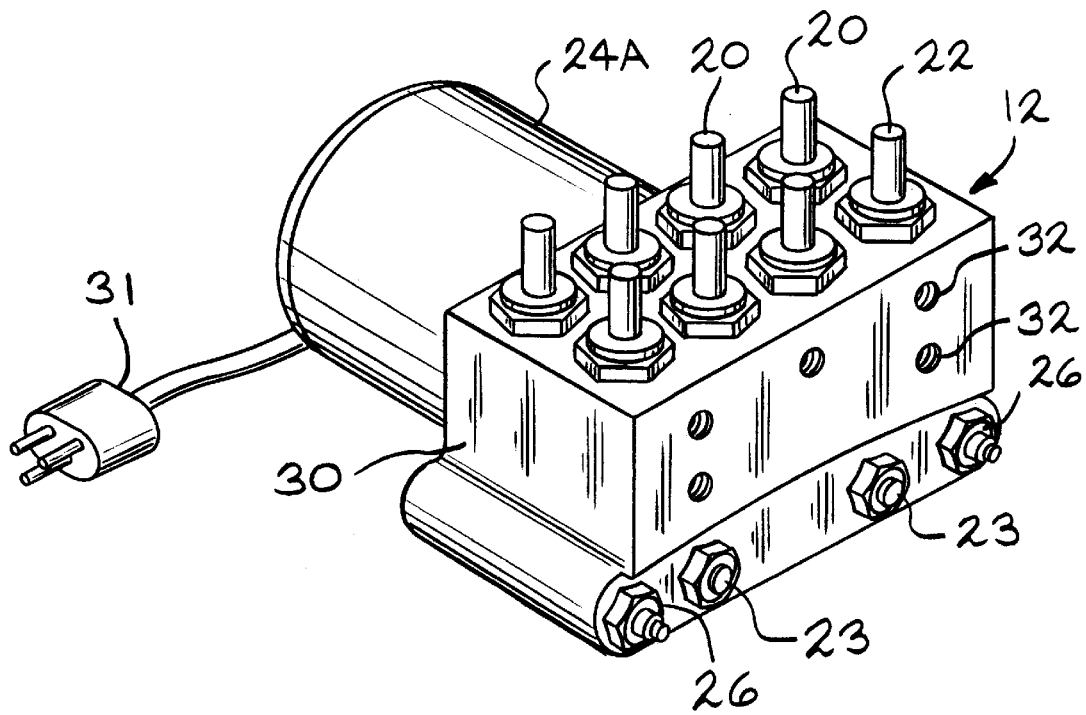
FIG. 2 is a perspective view of a hydraulic control unit of the anti-lock braking system of FIG. 1.

FIG. 2 is a perspective view of the hydraulic control unit (HCU) 12 illustrated schematically in FIG. 1. The HCU 12 includes a valve housing 30 formed from a suitable material. The pump (not illustrated in FIG. 2), driven by an electric motor 24A having a connector 31, is mounted on one wall of the housing 30. A plurality of isolation valves 20 and hold/dump valves 22 (one for each wheel of the vehicle in this embodiment) extends from another wall of the is housing 30. In FIG. 2, the solenoid pin portions of the isolation valves 20 and hold/dump valves 22, which are in axial alignment with the valves 20 and 22 themselves, are shown extending from a wall of the housing 30. Openings 32 are formed in yet another wall of the housing 30 for a plurality of brake lines (not illustrated) leading either to the slave cylinders 18 of each wheel or to the master cylinder 16. Extending from the same wall are a pair of attenuators 26. One attenuator 26 is provided for two of the vehicle wheels located on one line and the other is for the remaining two wheels located on another line fed from the two chamber master cylinder 16. Also extending from the same wall are a pair of low pressure accumulators 23.

Figure 3:
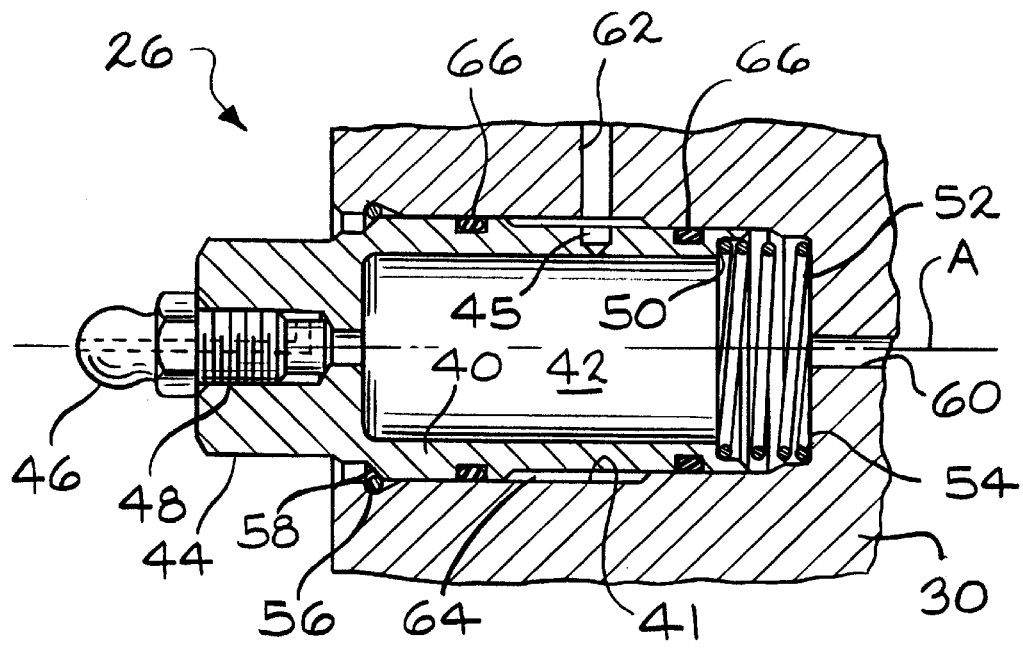
FIG. 3 is an sectional view of a conventional noise attenuator for use in a hydraulic control unit of FIGS. 1 and 2.

A conventional attenuator 26 is illustrated in section in FIG. 3. The attenuator 26 includes a hollow cylinder 40 received in sliding engagement within a bore 41 formed in the housing 30. The hollow interior portion in the cylinder 40 forms a fluid reservoir 42, enclosed at its outer end by a head member 44. The cylinder 40 includes an orifice 45 extending through the cylinder wall approximately midway of the axial length of the fluid reservoir 42 which is filled with brake fluid. A bleed screw 46 is threaded within a counterbore 48 formed in the head member 44. The counterbore 48 is in fluid communication with the fluid reservoir 42. At its inner end, the cylinder 40 includes a counterbore 50 which forms a seat upon which a compression spring 52 is seated. The spring 52 bears against a bottom wall 54 of the bore 41 to maintain the cylinder 40 against an annular retainer clip 56. The retainer clip 56 is seated within a groove formed within the HCU 12 concentrically about the bore 41 and bears against a shoulder 58.

The housing 30 also includes an inlet passage 60 concentrically located relative to the cylinder 40 along an axis A. An outlet passage 62 is located in the housing 30 about an axis approximately perpendicular to axis A. An annular fluid chamber 64 is formed between an outer surface of the cylinder 40 and the housing 30 and is in fluid communication with the orifice 45. Fluid from the inlet passage 60 flows into the reservoir 42 and out through the orifice 45 and annular chamber 64 to reach the outlet passage 62. Fluid exiting the outlet passage 62 travels through the fluid line extending between the master cylinder 16 and the isolation valve 20. O-ring seals 66 seated in respective grooves in the outer surface of the cylinder 40 near both ends of the annular chamber 64 prevent brake fluid leaks from the chamber 64.

Figure 4:
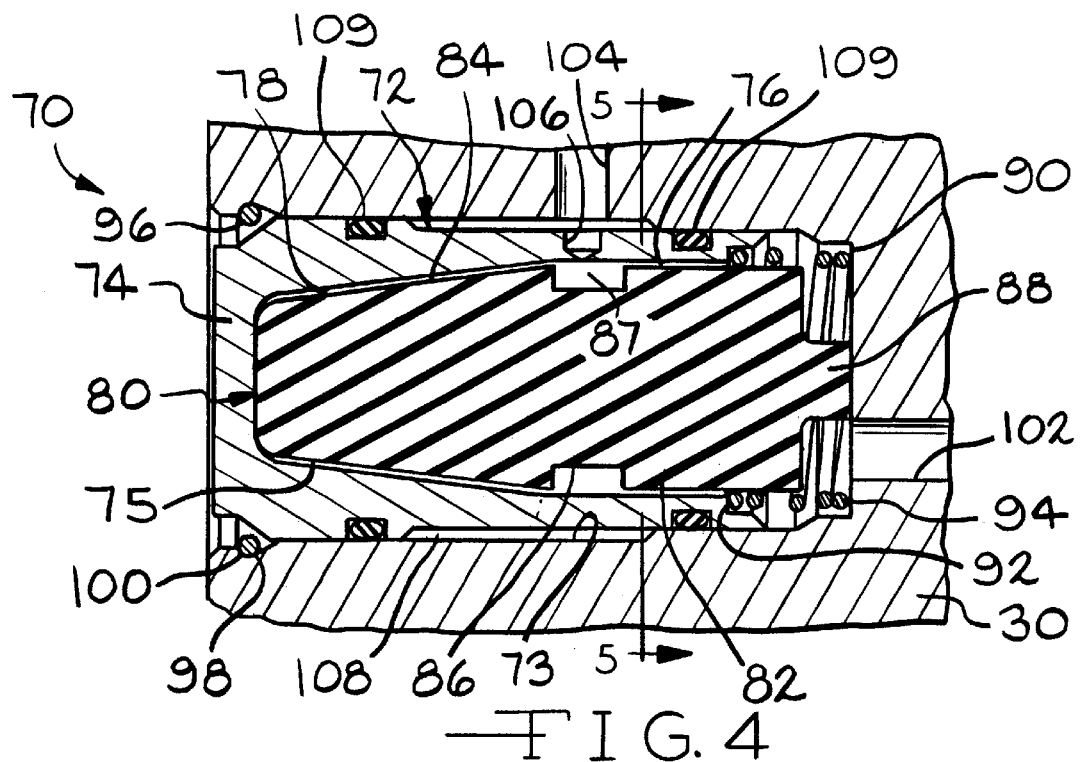
FIG. 4 is a sectional view of a noise attenuator according to this invention for use in the hydraulic control unit of FIGS. 1 and 2.

An attenuator according to this invention for use in the HCU 12 is indicated generally at 70 in FIG. 4. Attenuator 70 replaces the conventional attenuator 26 of FIGS. 1–3 in the HCU 12. The attenuator 70 includes a hollow cylinder 72 slidably received in a bore 73 formed in the housing 30. Bore 73 defines a fluid chamber having a sidewall and a bottom wall 90.

At its outer end, the cylinder 72 includes an end cap 74, preferably integrally formed with the cylinder 72, which cooperates with the cylinder 72 to define a tapered interior chamber 75. Preferably, an outer surface of the end cap 74 does not extend or project beyond the wall of the housing 30. Preferably, the tapered interior chamber 75 has a first, inner section 76 formed by a cylindrical bore and a second, outer section 78 tapered as desired by reducing the inner diameter of the second section 78 to a predetermined inner diameter adjacent the end cap 74.

An elastomeric core piece or plug 80 is received in and fills a substantial volume of the interior chamber 75. Preferably, the elastomeric core piece 80 has a profile complementary to the tapered interior chamber 75. The core piece 80 includes a first, inner section 82 having a generally cylindrical section and a second, outer section 84 tapered to fit within the interior chamber 75. Preferably, an annular groove 86 is formed in an outer surface of the core piece 80 between the first section 82 and the second section 84. An annular fluid chamber 87 is formed in the interior volume between the groove 86 and an inner surface of the cylinder 72. The inner end of the core piece 80 includes an inwardly projecting stem 88 which engages a bottom wall 90 of the bore 73. An annular seat 92 is provided at the inner end of the cylinder 72 for a compression spring 94. The spring 94 bears against the bottom wall 90 to maintain the cylinder 72 against an annular retainer clip 96. The retainer clip 96 is seated within a groove 98 formed within the housing 30 concentrically about the bore 73 and bears against a shoulder 100. When the attenuator 70 is installed, the stem 88 is compressed and also urges the attenuator 70 against the retainer clip 96.

An inlet passage 102 leading to the chamber of bore 73 is formed in the housing 30. As illustrated, the inlet passage 102 can have an axis offset from an axis of the bore 73. An outlet passage 104 leading away from the chamber of the bore 73 is formed in the housing 30 and can have an axis approximately perpendicular to the axis of the bore 73. A restricted orifice 106 is provided in the cylinder 72 in communication with the annular fluid chamber 87. Preferably, the orifice 106 is aligned with the outlet passage 104. A second annular fluid chamber 108 formed between the sidewall of the bore 73 and an outer surface of the cylinder 72 is in fluid communication with the orifice 106. O-ring seals 109 are seated in respective grooves in the outer surface of the cylinder 72 near both ends of the annular chamber 108 to prevent fluid leaks from the chamber 108.

Figure 5:
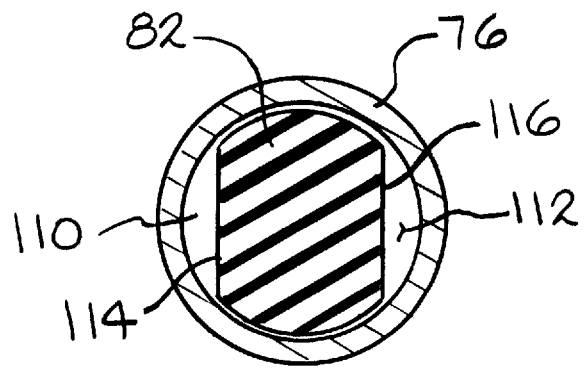
FIG. 5 is a sectional view taken along line 5–5 of FIG. 4 of the attenuator removed from the hydraulic control unit for clarity of illustration.

As stated above, the elastomeric core piece 80 substantially fills the tapered interior chamber 75 of the cylinder 72, thereby substantially reducing the amount of air which must be purged from the attenuator 70 during an evacuation process. However, a relatively small annular clearance is provided between the outer surface of the core piece 80 and the inner surface of the sidewall of the cylinder 72 along the axial length of the core piece 80. Brake fluid fills this clearance during use of the attenuator 70. As illustrated in FIG. 5, two opposite portions of the outer surface of the inner section 82 of the core piece 80 are preferably removed to provide fluid chambers 110 and 112. Chamber 110 can be formed by removing material along a chord 114 while chamber 112 can be formed by removing material along a chord 116 to form flats on the core piece During use, brake fluid fills chambers 110 and 112. Chambers 110 and 112 are in fluid communication with each other via the clearance between the core piece 80 and the cylinder 72.

The elastomeric core piece 80 acts in a similar manner as the working fluid in the reservoir 42 of attenuator 26. Attenuator 70 takes advantage of the fact that the bulk modulus of compressibility of a the core piece 80 is preferably the same or substantially the same as that of brake fluid. The preferred elastomer for the core piece 80 is ethylene propylene diene monomer, a material readily available at a reasonable cost and chemically compatible with brake fluid. Other elastomers having the desired characteristics may also be used. Additionally, certain plastics such as polypropylene having similar compressibility characteristics as an elastomer and which are compatible with brake fluid can be used to form the core piece 80. Such materials can be characterized as polymeric materials and can include rubber and thermoplastic elastomers and plastics. In other embodiments of the present invention, the attenuator may include the cylinder 72 having a tapered interior chamber 75 without an elastomeric core piece 80.

Fluid from the inlet passage 102 flows into chambers 110 and 112 to the annular chamber 87 via the clearance between inner section 82 and inner section 76. Fluid passes through the orifice 106 and the second annular chamber 108 to the outlet passage 104. Fluid exiting the outlet passage 104 travels through the fluid line extending between the master cylinder 16 and the isolation valve 20.

The core piece 80 is strategically located between the inlet passage 102 and the outlet passage 104. The volume of the interior chamber 75 not filled by the core piece 80 (including chambers 110, 112 and 87 and the clearance between the core piece 80 and the cylinder 72) provides a streamlined path for fluid flowing through attenuator 70. This streamlined path substantially eliminates fluid turbulence typically found in reservoir 42 of attenuator 26 due to a relatively large volume of air resulting in aeration of the brake fluid. This streamlined path permits any air in the unfilled interior chamber 75 to be easily purged or sucked out as brake fluid passes through the attenuator 70. This streamlined path also eliminates the need for a bleed screw for attenuator 70. Preferably, the attenuator 70 is orientated so that when the HCU 12 is mounted on a vehicle, the orifice 106 points upwardly. The tapered profile of the core piece 80 permits air in the interior chamber 75 to move upwardly to the outlet passage 104 to further improve air purging capabilities.

Figure 6:
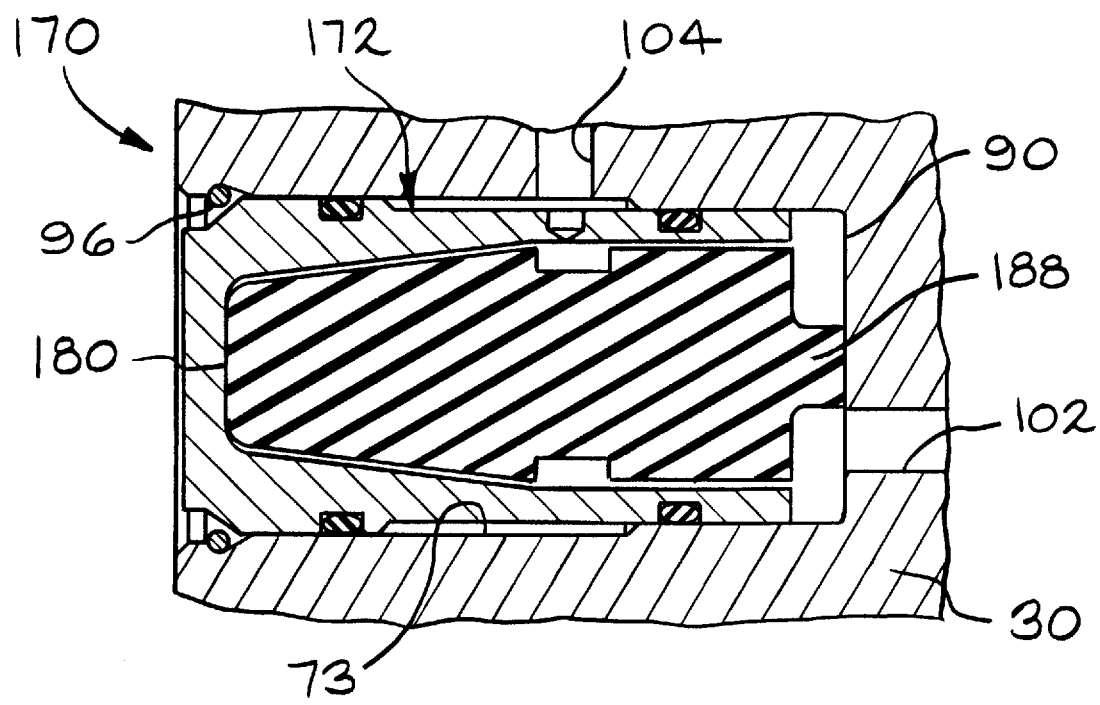
FIG. 6 is a sectional view of a second embodiment of a noise attenuator according to this invention for use in the hydraulic control unit of FIGS. 1 and 2.

A second embodiment of an attenuator according to this invention is indicated generally at 170 is FIG. 6. The attenuator 170 includes a cylinder 172 identical to cylinder 72 except for the omission of seat 92 at its inner end. Attenuator 170 does not include a compression spring such as spring 94 of attenuator 70. An elastomeric core piece 180 is identical to core piece 80 and includes a stem 188. Stem 188 is formed to bear against the bottom wall 90 and provide a sufficient spring force to retain cylinder 172 against retainer clip 96. Attenuator 170 replaces attenuator 70 in the bore 73 of the housing 30. Fluid flow through attenuator 170 is identical to that described above for attenuator 70.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A hydraulic control unit for a vehicular anti-lock braking system comprising:
    a housing;
    a bore in an outer wall of the housing defining a chamber having a sidewall and a bottom wall;
    a fluid inlet passage formed in the housing open to the chamber;
    a fluid outlet passage formed in the housing open to the chamber; and
    an attenuator received within the chamber and not extending beyond the outer wall of the housing for damping fluid pressure pulses entering the chamber, the attenuator including a hollow cylinder formed by a longitudinal cylinder sidewall closed at an outer end by an end cap, the cylinder sidewall and end cap defining an interior chamber having an inner diameter tapered toward the end cap, the cylinder sidewall having an orifice through which fluid from the tapered interior chamber is returned to the chamber of the housing to reach the fluid outlet passage.

2. The hydraulic control unit defined in claim 1 wherein the tapered interior chamber includes a first section formed by a cylindrical bore and a second section having an inner diameter tapered to a predetermined inner diameter adjacent the end cap.

3. The hydraulic control unit defined in claim 1 wherein the attenuator includes an elastomeric core piece received in the tapered interior chamber.

4. The hydraulic control unit defined in claim 3 wherein the elastomeric core piece has a profile generally complementary to the tapered inteior chamber.

5. The hydraulic control unit defined in claim 2 wherein an elastomeric core piece having a first generally cylindrical section and a second tapered section is received in the tapered interior chamber.

6. The hydraulic control unit defined in claim 5 wherein the elastomeric core piece includes an annular groove formed between its first and second sections.

7. The hydraulic control unit defined in claim 5 wherein an outer portion of the first section is removed along a chord.

8. The hydraulic control unit defined in claim 5 wherein opposite outer portions of the first section are removed along predetermined respective chords.

9. The hydraulic control unit defined in claim 3 wherein the elastomeric core piece engages the bottom wall of the bore in the housing.

10. The hydraulic control unit defined in claim 9 wherein a stem is formed ion the elastomeric core piece which is compressed against the bottom wall of the bore to urge the end cap against a retainer in the bore.

11. The hydraulic control unit defined in claim 3 including a spring inserted between the bottom wall of the bore and the attenuator to urge the attenuator against a retainer in the bore.

12. The hydraulic control unit defined in claim 3 wherein a clearance is provided between the cylinder sidewall and an axial length of the elastomeric core piece.

13. An attenuator for a hydraulic control unit of a vehicular anti-lock braking system comprising:
    a hollow cylinder having a sidewall and an end cap defining an interior chamber in communication with a fluid inlet passage of the hydraulic control unit, the interior chamber having a tapered inner diameter toward the end cap;
    an orifice formed in the sidewall in communication with a fluid outlet passage of the hydraulic control unit;
    an elastomeric core inserted into and substantially filling the tapered interior chamber, the elastomeric core having a tapered outer diameter toward the end cap; and
    a clearance provided between the elastomeric core and the sidewall forming a fluid path for fluid traveling from the inlet passage through the tapered interior chamber to the outlet passage.

14. The attenuator defined in claim 13 wherein the elastomeric core has a first generally cylindrical section and a second tapered section.

15. The attenuator defined in claim 14 wherein an annular groove is formed in the elastomeric core between the first and second sections.

16. The attenuator defined in claim 15 wherein a portion of the first sections removed along a predetermined chord.

17. The attenuator defined in claim 15 wherein opposite outer portions of the first section are removed along a predetermined respective chords.

18. A hydraulic control unit for a vehicular anti-lock braking system comprising:
    a housing;
    a bore in an outer wall of the housing defining a chamber having a sidewall and a bottom wall;
    a fluid inlet passage formed in the housing open to the chamber from the sidewall;
    a fluid outlet passage formed in the housing open to the chamber from the sidewall; and an attenuator seated within the chamber for damping fluid pressure pulses in the chamber, the attenuator including a hollow cylinder closed at one end by an end cap, the cylinder and end cap defining an interior chamber having an inner diameter tapered toward the end cap;

an orifice in the cylinder in fluid communication with the fluid outlet passage; and an elastic plug received in the tapered interior chamber having a profile generally complementary to the tapered interior chamber.

19. The hydraulic control unit defined in claim 18 wherein:

the cylinder includes a first section formed by a cylindrical bore and a second section having an inner diameter tapering to a predetermined inner diameter adjacent the end cap; and the elastic plug has a first generally cylindrical section and a second tapered section.

20. The hydraulic control unit defined in claim 19 wherein an outer portion of the first section of the elastic plug is removed along a predetermined chord.

* * * * *